United States Patent [19]
Nettleton

[11] 3,750,424
[45] Aug. 7, 1973

[54] ROTARY COUPLINGS

[75] Inventor: David John Nettleton, South Wigston, Leicestershire, England

[73] Assignee: The Rank Organization Limited, London, England

[22] Filed: Dec. 6, 1971

[21] Appl. No.: 205,198

[30] Foreign Application Priority Data
Jan. 27, 1971 Great Britain..................... 3,305/71

[52] U.S. Cl.............................. 64/31, 64/6, 64/11, 192/71, 287/91, 64/8
[51] Int. Cl.............................................. F16d 3/04
[58] Field of Search ...................... 64/31, 29, 6, 12, 64/15, 17 SP, 11, 8; 192/71, 104; 287/91

[56] References Cited
UNITED STATES PATENTS

| | | |
|---|---|---|
| 2,354,961 | 8/1944 | O'Donnell.................. 64/8 |
| 3,485,444 | 12/1969 | Linzerkirchner.................. 192/82 T |
| 1,947,965 | 2/1934 | Beggs......................... 64/8 |
| 2,881,602 | 11/1959 | Baker et al. ............................ 64/29 |

Primary Examiner—Charles J. Myhre
Assistant Examiner—Randall Heald
Attorney—Holcombe, Wetherill & Brisebois

[57] ABSTRACT

A rotary coupling comprising a male member for attachment to one shaft and a female member for attachment to another shaft, in which one of said members is formed to present at least two slots, parallel to the axis and spaced equidistantly about said one member, towards the other member, the axial edges of each slot being sloped to give it a wedge shape being wider towards said other member, and in which the other member includes two radial drive pins located diametrically opposite each other and biased towards said one member for engagement with the slots, the ends of the drive pins being tapered to mate with the slots.

4 Claims, 8 Drawing Figures

PATENTED AUG 7 1973 3,750,424

ROTARY COUPLINGS

This invention relates to rotary couplings. It is particularly suitable for use in providing mechanical coupling between modules of a modular system such as a modular servosystem for controlling a zoom lens in a television or cine camera.

In such an application, it has been proposed to provide a coupling in which a spring-loaded dog engages in a slotted shaft. This arrangement is unable to deal with misalignment of the driving and driven shafts, and this is a serious drawback in a modular system where one module must be "plugged in" to another with a consequent likelihood of small misalignments.

It is therefore an object of the present invention to provide a rotary coupling having an improved tolerance for shaft misalignment. A further object is to provide a coupling in which backlash is minimised.

Accordingly, the present invention provides a rotary coupling comprising a male member for attachment to one shaft and a female member for attachment to another shaft, in which one of said members is formed to present at least two slots, parallel to the axis and spaced equidistantly about said one member, towards the other member, the axial edges of each slot being sloped to give it a wedge shape being wider towards said other member, and in which the other member includes two radial drive pins located diametrically opposite each other and biased towards said one member for engagement with the slots, the ends of the drive pins being tapered to mate with the slots.

A particular embodiment of the present invention will now be described, by way of example, with reference to the accompanying drawings, in which.

Figure 5:
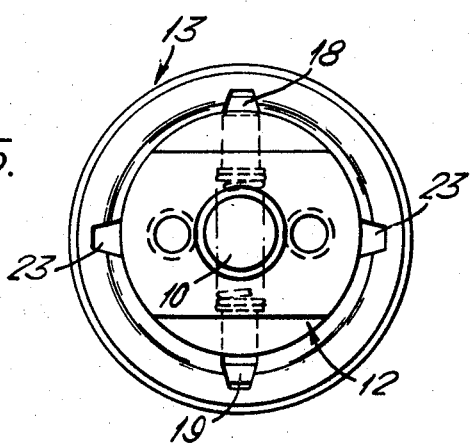
FIG. 5 is a diagrammatic end view corresponding to FIG. 4.
Figure 6:
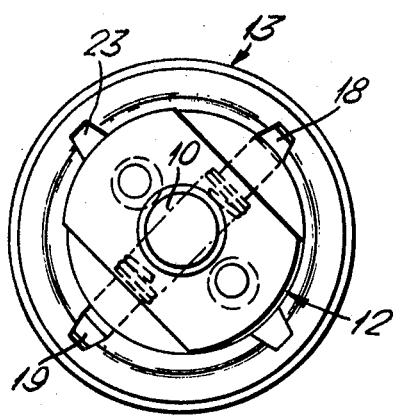
Figure 7:
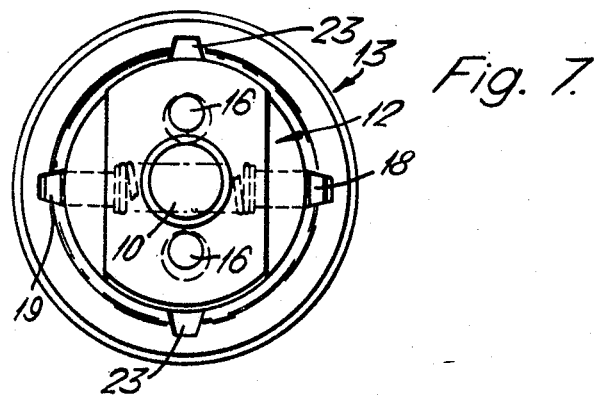
Figure 8:
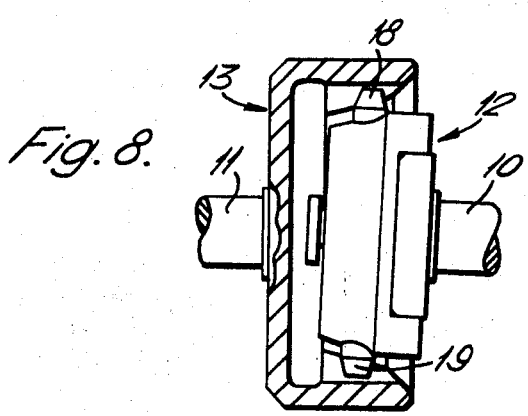

FIGS. 6 and 7 are similar to FIG. 5 but show the effect of rotating the coupling through 45° and 90° respectively; and FIG. 8 is an elevation, partly in section, showing the effect of angular misalignment.

Figure 1:
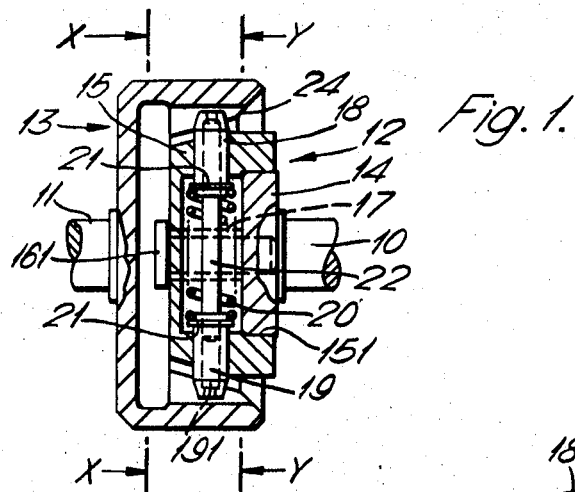
FIG. 1 is a sectional elevation of a rotary coupling according to the invention.
Figure 2:
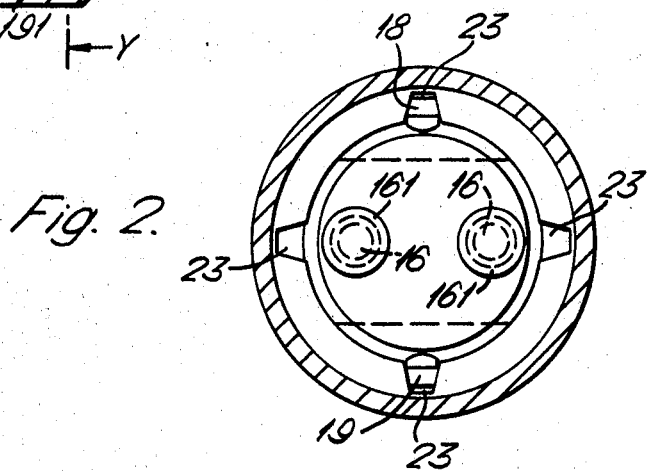
FIG. 2 is a sectional end view taken on X—X of FIG. 1.
Figure 3:
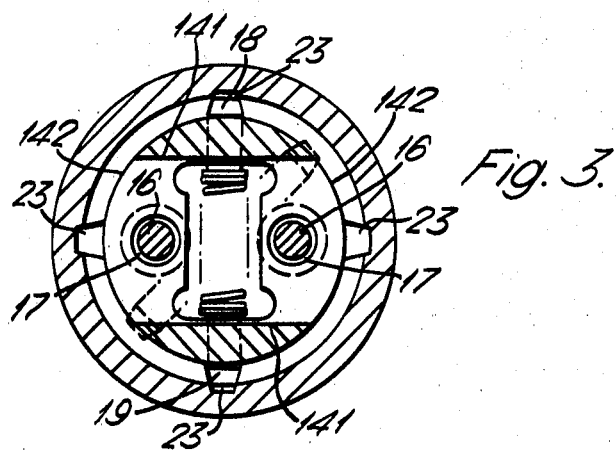
FIG. 3 is a sectional end view taken on Y—Y of FIG. 1.

Referring now particularly to FIGS. 1 to 3, a coupling for transmitting torque between two shafts 10 and 11 comprises a male member 12 attached to the shaft 10 and a female member 13 attached to the shaft 11. The male member comprises a flange 14 secured to the shaft 10 and an end plate 15 mounted on the flange 14. The flange 14 is bounded by two arcuate sides 141 and two straight sides 142 over which sides 142 a keying slot 151 in the end plate 15 fits, to allow the end plate 15 to move radially over the flange 14 while maintaining a driving connection between the two. The flange 14 also mounts two stub shafts 16 which are provided with shoulders 161 to maintain the end plate 15 on the flange 14 but whose spacing from the flange 14 is sufficient to allow a small axial movement or float of the end plate 15. The stub shafts 16 pass through bores 17 in the end plate 15, which are of greater diameter than the shafts 16 to allow the radial movement referred to above.

Two diametrically opposed drive pins 18, 19 pass radially through bores on the end plate 15 and are biased outwardly by a compression spring 20 bearing on circlips 21 on the drive pins. The mutual alignment of the drive pins 18, 19 is ensured by a rod 22 cemented in the drive pin 18 and sliding in a bore 191 in the other drive pin 19.

The female member 13 is of generally cylindrical form, open at its end remote from the shaft 11. The internal surface of the female member 13 slopes in a conical form and has cut in it four equispaced slots 23 parallel to the axis. The longitudinal edges of the slots 23 are sloped to give a wedge-shaped cross-section, and the outer ends of the drive pins 18, 19 are cut with a similar slope to interfit with the slots 23. The circumferential edge of the member 13 is chamfered at 24 to a radius greater than the maximum extension of the drive pins 18, 19.

To assemble the coupling, the male and female members 12 and 13 are pushed together. This movement may be on axis or may begin at an angle since the lead-in chamfer 24 and the conical inner surface of the female member 13 brings the male member to a suitable orientation. The drive pins 18, 19 may locate directly into slots 23. More generally however they will contact between slots 23 in which case they will be compressed by the lead-in chamfer 24 and will assume the position shown dotted in FIG. 3; subsequent rotation of the driving shaft 10 or 11 causes one member 12 or 13 to rotate about the other until the drive pins 18, 19 locate in slots 23. In this position, as best seen in FIGS. 2 and 3, the shafts 10 and 11 are coupled for rotation. Any axial misalignment is accommodated by the ability of the drive pins 18, 19 to slide along the slots 23.

Figure 4:
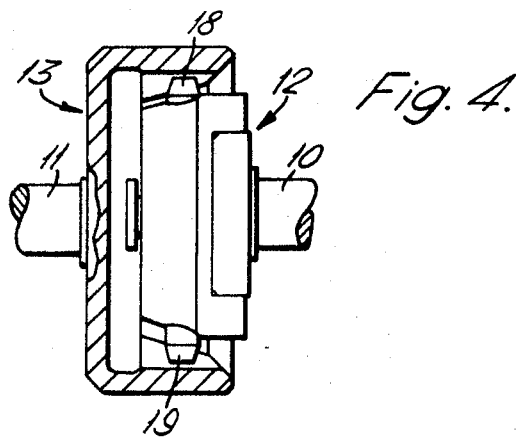
FIG. 4 is an elevation, partly in section, similar to FIG. 1 showing the effect of shaft misalignment.

Radial misalignment of the shafts 10, 11 is accommodated as shown in FIGS. 4 to 7. As seen in FIGS. 4 and 5, when the drive pins 18 and 19 are in line with the displacement of the shafts 10 and 11, they are free to float against the spring 20 to allow for this displacement. When the pins 18, 19 are at right angles to the displacement, as seen in FIG. 7, the pins 18, 19 are equally extended and compensation for the misalignment is provided by the end plate 15 moving across the flange 14. Intermediate these positions, a combination of the two accommodating movements takes place, as shown in FIG. 6.

Angular misalignment is also dealt with. When the coupling is in the position shown in FIG. 8, it is accommodated by the pins 18, 19 sliding along the slots 23. In the position 90° from this (not shown) the pins 18, 19 are free to turn about their axes to allow for the misalignment.

It will be appreciated that when any two or three of axial, radial and angular misalignment occur together, they are dealt with simultaneously in the above manner.

One may design the slope of the edges of the slots and drive pins, having regard to the area of contact and the frictional properties of the respective materials, to be at an angle such that the pins will be driven out of the slots at a given torque, thus providing a simple means of limiting the torque transmitted to a safe value. The determination of the appropriate dimensions is of course a matter of conventional mechanics and is therefore not described here.

The use of tapered or wedge-shaped drive pins and slots ensures that even with misalignment there is a firm engagement between the two members, thus minimising backlash. It also ensures that the coupling will engage even when one member is rotating relative to the other on insertion.

The invention thus provides a rotary coupling which can accommodate misalignment of the parts being coupled, and which is simple and quick to engage and disengage.

I claim:

1. A rotary coupling comprising a male member for attachment to one shaft and a female member for attachment to another shaft, in which the female member is of generally hollow cylindrical form and has at least two slots formed in its internal surface, the slots being parallel to its longitudinal axis and spaced equidistantly; and in which the male member comprises a flange for attachment to a shaft; at least one stub shaft mounted on the flange; an end plate defining a bore through which the stub passes, the stub shaft having a shoulder at its end remote from the flange, the distance between the flange and the shoulder being greater than the thickness of the end plate to allow limited axial movement of the end plate; and two drive pins held in the end plate diametrically opposite each other for biased radial extension therefrom.

2. A coupling as claimed in claim 1, in which the flange and end plate have interfitting radial key and slot surfaces whereby the end plate may be rotated by the flange while having said ability to move, in a radial direction.

3. A coupling as claimed in claim 1, in which the circumferential edge of said one member facing said other member is chamfered from a radius greater than the maximum extension of the drive pins to compress the drive pins on insertion of the male member.

4. A coupling as claimed in claim 1, in which the slope of the slot edges and drive pin ends is so calculated that the drive pins are driven out of the slots when a given limiting torque is applied to the coupling.

* * * * *